United States Patent Office 3,384,448
Patented May 21, 1968

3,384,448
PROCESS FOR RECOVERING VANADIUM
VALUES FROM CRUDE RESIDUA
Ralph Burgess Mason, Denham Springs, and Glen Porter Hamner, Baton Rouge, La., assignors to Esso Research and Engineering Company, a corporation of Delaware
No Drawing. Filed July 23, 1965, Ser. No. 474,509
12 Claims. (Cl. 23—20)

This invention is directed to recovering vanadium and other metals from crude residua, asphaltenes, aromatic tars and the like usually having initial boiling points of about 650° F.+.

More specifically, the present invention is directed to recovering vanadium from crude residua, asphaltenes, aromatic tars and the like residua having initial boiling points of about 650° F.+ by (a) heating an intimate blend of said residua and an organic solvent boiling in the range of about 150 to 800° F. at temperatures ranging from about 650 to 900° F. essentially in the absence of oxygen for an average residence time of about 0.1 to about 6 hours to form an insoluble concentrate containing a substantial portion of the vanadium present in said residua feed, (b) separating said insoluble vanadium-containing concentrate, (c) contacting said concentrate with a halogen-containing compound under conditions suitable for forming the corresponding vanadium halide, and (d) recovering said vanadium halide.

When said 650° F.+ residua also contains iron and nickel, the iron and nickel present therein will also be concentrated in the separated insolubles obtained via steps (a) and (b). The thus concentrated iron and nickel can be recovered readily in accordance with the invention by roasting said separated residue with oxygen at elevated temperatures, e.g. about 400 to 3000° F., to yield the iron and nickel oxides which can then be reduced with hydrogen to yield the iron and nickel metals. In the case of 650° F.+ residua containing vanadium, iron and nickel, the iron and nickel can be removed before vanadium recovery via steps (c) and (d) is conducted; or the vanadium can be recovered first via steps (c) and (d), and the iron and nickel can be recovered later.

According to a preferred embodiment of this invention, when the vanadium, iron and nickel are recovered from said 650° F.+ residua, the iron and nickel are recovered before the vanadium by proceeding as in steps (a) and (b) above to obtain a concentrated containing vanadium, iron and nickel and then roasting said concentrate with oxygen at about 400 to 3000° F. to obtain the corresponding metal oxides which are then reduced with hydrogen (or other suitable reducing agents) to the vanadium reduced to lower oxide, iron and nickel metals. The metallic iron and nickel are then preferentially separated from the vanadium oxide by contact with carbon monoxide at temperatures of about 150 to about 350° F. and pressures of about 200 to about 2,000 p.s.i. to preferentially form the iron and nickel carbonyls. Under these conditions, vanadium does not form the carbonyl and the iron and nickel carbonyls are removed as a liquid. This liquid, containing the iron and nickel carbonyls, is distilled under pressure to yield nickel carbonyl as an overhead product and iron carbonyl as a bottoms product. The higher boiling carbonyls of any cobalt present along with traces of vanadium carbonyl, if present, remain with the iron. If the cobalt carbonyl is present in appreciable quantities, it can be recovered conveniently by further fractionation of the carbonyls in the bottoms stream to obtain essentially complete separation thereof. These respective carbonyl streams of iron, nickel (and cobalt in vanadium, if present) can then be thermally decomposed at temperatures of 100 to 500° F. to obtain the corresponding metals in a state of very high purity.

The solids discharged from the carbonyl reaction contain vanadium oxide, usually as the lower oxide of vanadium, which can then be recovered conveniently by treatment in accordance with steps (c) and (d) above.

As noted hereinabove, the vanadium is recovered from the vanadium-concentrate or the oxide thereof by contacting said vanadium-containing concentrate or oxide thereof with a halogen-containing compound under the conditions suitable for forming the corresponding vanadium halide which is then recovered using conventional gas or liquid recovery means. This contact can be conducted at temperatures ranging from about 50 to 1600° F. and pressures ranging from about 5 to 500 p.s.i. The contact of the vanadium-containing concentrate or oxide thereof can be made with a halogen acid, e.g., HCl, HF, HBr, or HI. Alternately, a gaseous halogen, per se, can be used, e.g., gaseous chlorine, bromine, fluorine, or iodine. When this contacting is conducted using a gaseous halogen containing material it is usually conducted at temperatures ranging from about 400 to 1600° F., which insures that the vanadium halide thus formed readily volatilizes. Suitable pressures for conducting step (c) can range from 0.5 atm. to 200 p.s.i., usually range from about 1 atm. (15 p.s.i.) to 100 p.s.i., and more preferably range from about 1 atm. (15 p.s.i.) to about 50 p.s.i.

According to one preferred embodiment of this invention, step (c) is conducted by contacting the vanadium-containing concentrate or oxide thereof with chlorine gas at a temperature of 400 to about 1500° F. and preferably at atmospheric pressure. The volatilized vanadium halide thus obtained is a high purity vanadium tetrachloride. This vanadium tetrachloride of high purity can be further purified by fractional distillation of the liquid product recovered from the flash separation zone or it can be converted directly to metallic vanadium alloys of known concentration and purity by any suitable reduction with other metals such as iron in production of steel. A very preferred way of conducting this chlorine gas contact is to react the chlorine gas with the vanadium-containing concentrate or oxide thereof at temperatures of about 400 to 700° F. because in general less contamination results from any iron chlorides that may be present at these lower halogen treating temperatures. Any non-volatile chlorides, e.g., nickel and residual iron chlorides, can be leached with water and concentrated for further recovery procedures.

According to another preferred embodiment of this invention, the vanadium-containing concentrate or oxide thereof is contacted with aqueous HF usually of 10–90 wt. percent concentration to form the corresponding vanadium halide, viz., vanadium fluoride, at temperatures of 50 to 350° F. and pressures of 15 to 500 p.s.i. The use of hydrogen fluoride offers a unique advantage, especially when the vanadium-containing concentrate also contains iron and nickel because the iron and nickel fluorides are not substantially soluble in cold aqueous solutions. Thus, the major part of the iron and nickel can be removed by filtration and/or settling before other concentration steps, including volatilization occurs, thus resulting in a highly concentrated product stream of vanadium fluoride. Where the iron and nickel content of the residue obtained from steps (a) and (b) is comparatively high, the hydrogen fluoride treatment and filtration from cold aqueous solutions as outlined above is preferred. Of course, where the iron and nickel content of said concentrate is low, the concentrate can be treated directly with the hydrogen halide without the preliminary roasting or roasting and reduction procedures being conducted.

It is a very important and essential feature of this invention that the recovery of the vanadium and other metals present is not conducted until steps (a) and (b) are first conducted. The thermal depolymerization step (a) amounts to a noncatalytic, thermal depolymerization procedure conducted in the presence of a solvent but essentially in the absence of oxygen to obtain lower molecular weight more useful materials from the residua 650° F.+ essentially solid feeds. During this noncatalytic thermal depolymerization in the presence of the solvent, the insoluble concentrate thus produced contains the vanadium, iron, and nickel metals concentrated in the ash components (referred to hereinabove as vanadium-containing concentrate); and the amount of equipment and material which is processed for the recovery of said metals is substantially reduced compared to conventional and prior art procedures for recovering vanadium and other metals. Thus, in order to secure the benefits of this invention, the thermal depolymerization procedure as outlined above in step (a) must be conducted at the conditions specified and substantially in the absence of oxygen to produce the insoluble concentrate which is separated via step (b). Then, the recovery of vanadium and other metals present, e.g., iron and nickel, can be conducted in accordance with the procedures outlined hereinabove.

The thermal depolymerization procedure referred to hereinabove as step (a) is conducted by first blending the crude residua 650° F.+ feedstock intimately into a suitable organic solvent having a boiling range of about 150 to about 800° F. This organic solvent is preferably an aromatic or hydrogenated aromatic (cyclic) solvent having a boiling range of about 400 to about 600° F. Usually, the suitable organic solvent is heated at temperatures of 200 to 450° F. before, during, or after blending of the residua feed with the solvent to aid in dissolving the residua feed. Then, the residua feed-solvent solution is thermally depolymerized in a liquid phase operation by heating it at temperatures of 650 to 900° F. for from 0.1 to about 6 hours substantially in the absence of oxygen. The substantial exclusion of oxygen from step (a) is essential. Thus, the feedstock and solvent should contain less than 0.1 wt. percent oxygen, and preferably the crude residua feedstock and solvent should contain less than 100 p.p.m. oxygen from the onset of processing until the completion of step (a), viz., the completion of the thermal depolymerization procedure resulting in the formation of the vanadium and other metals-containing concentrates. The blending of the residua feedstock in the solvent in the heating thereof prior to thermal depolymerization at temperatures of 650 to 900° F. is likewise accomplished substantially in the absence of both oxygen (molecular), and oxygen-containing compounds which thermally release molecular oxygen in situ during the subsequent heat treatment (thermal depolymerization). Failure to observe this substantial exclusion of oxygen during step (a) of the present process will result in excessive coke formation from the residua feed and thus cause a lack of concentration of the vanadium and other metals in the vanadium and other metal-containing concentrate.

The residua 650° F.+ feeds to the process of the present invention are high molecular weight materials which usually contain sulfur and vanadium, iron, nickel and other metals. These materials usually have Conradson carbon ratings greater than about 15. The exemplary feedstock materials which can be employed in the process of this invention to recover vanadium and other metals therefrom include, but are not limited to, the following: atmospheric residua and vacuum residua; asphaltenes; aromatic tars; coal tars; shale oils; heavy synthetic oils; natural tars and asphalts; aromatic extracts; coke cycle stocks; pitches; and the like 650° F.+ hydrocarbon materials. These materials usually possess API gravities of about −8 to about +30°, molecular weights of about 200 to about 20,000 and initial boiling points above 650° F. Particularly preferred feedstocks to the process of this invention are heavy virgin residua characterized by API gravities of about 0 to about 20°, molecular weights of about 400 to 6,000, and initial boiling points above about 900° F.

Usually, the residua feedstock is blended with an aromatic solvent in a volume ratio of about 0.5 to 5:1 volumes of aromatic solvent (or suitable solvent mixture) per volume of virgin residua feedstock. During the blending step, the solvent is preferably preheated to temperatures of about 200 to 450° F., and more preferably from about 200 to 300° F.; and the system is usually blanketed with an inert gas, for example, nitrogen, hydrogen, etc. The available (molecular) oxygen content, including peroxides, of the feedstock and solvent should be less than 0.1 wt. percent, and preferably less than 100 p.p.m. as noted hereinabove.

The blended solution of residua feed and solvent is then heated in the substantial absence of oxygen at temperatures ranging from 650 to 900° F., usually at temperatures ranging from 650 to 850° F., and more preferably at temperatures ranging from 675° F. to about 775° F. The heating is continued to allow an average residence time to which the residua feed-solvent solution is subjected to these temperatures in the presence of the solvent for time periods of about 0.1 to about 6 hours, usually from about 0.5 to about 6 hours, and more preferably from about 1 to about 4 hours. During this heating step, pressures ranging from atmospheric pressure to about 2000 p.s.i.g. can be used. Usually, however, the pressures employed during thermal depolymerization and concentration of the metals range from about 20 p.s.i.g. to 2000 p.s.i.g., and preferably the pressures employed range from about 200 p.s.i.g. to 1600 p.s.i.g. with hydrogen being employed as an inert gas to establish all or part of the pressure. As noted hereinabove this thermal depolymerization stage (a) is conducted in the liquid phase so the pressure is adjusted upwards to assure to solvent remains in the liquid phase throughout thermal depolymerization and formation of the vanadium and other metals-containing concentrate.

Subsequent to thermal depolymerization step (a) the solution of lower molecular weight products, including gas oils, naphthas, gasolines, and lighter fractions along with a 900° F.+ liquid fuel oil fraction is filtered using any conventional filtration system, e.g. filters, centrifuge settling tanks, etc., useful to separate the insoluble vanadium and other metals-containing concentrate from the liquid lower molecular weight products stream. A concomitant advantage of this invention is that it not only demetallizes, but also desulfurizes the liquid lower molecular weight products obtained by the thermal depolymerization. Thus, a substantial portion of the sulfur present in the original residua feedstock is concentrated along with the metals in the insoluble carbonaceous concentrate which is insoluble in the liquid lower molecular weight products. This insoluble concentrate is then separated, e.g., filtered, therefrom as indicated hereinabove. This concentration of vanadium and other metals in the vanadium and other metal-containing concentrate is appreciable, thus offering substantial economies in recovery of vanadium and other metals sought to be removed from the residua feed.

For example, the conversion of 650° F.+ asphaltenes feedstock from Bachaquero crude to obtain vanadium therefrom along with nickel when conducted in accordance with this invention results in insoluble concentrates removed by filtration showing a high concentration of vanadium. The solid insoluble concentrate obtained by filtration and settling contained from 2.5 to about 5 wt. percent vanadium. When this is compared with a vanadium content of about 400 to 2000 p.p.m. in the original Bachaquero residua crude feed to the process of this invention, the economic value and meritorious nature of this invention become clear. An approximately equivalent concentration of nickel is likewise secured.

A wide variety of solvents can be employed in accordance with the present invention. Usually, however, the solvents are aromatic or partially or completely hydrogenated aromatic (cyclic) solvents usually boiling within a boiling point range of about 150 to 800° F. and more preferably about 400 to about 600° F. While such solvents as benzene, toluene, ortho-, meta-, and para-xylenes, ethyl benzene, etc., can be used, the preferable solvents are the substituted monocyclic, the bicyclic, and tricyclic aromatic solvents. Exemplary preferred materials suitable for use as solvents in accordance with this invention include, but are not limited to, the following: naphthalene; alkyl-substituted naphthalenes, such as methyl naphthalene; anthracene; phenanthrenes; tetralin; decalin; phenol; xylidine; toluidine; phenylene diamine; aminophenol; alpha-methyl naphthyl amine; alpha-naphthol; beta-naphthol; and compounds of a similar nature which can have a variety of substituents, said substituents being inert to the thermal depolymerization and metals concentration reactions involved to the extent that they do not interfere therewith. Mixtures of any two or more of the above solvents can be employed.

The formation and recovery of the vanadium halide can be conducted conveninetly in accordance with this invention by contacting the filtered vanadium and other metals-containing concentrate with a halogen containing compound under conditions suitable for forming a volatile or liquid vanadium halide as noted above, which can then be recovered as a gas by suitable gas recovery devices or condensed and recovered as a liquid. Usually, this contact (referred to hereinabove by step (c)) is conducted at temperatures of 400 to 1600° F. and pressures of 0.5 atm. to 200 p.s.i. using any suitable halogen compounds such as a halogen acid e.g., HF, or gaseous halogen, e.g., gaseous chlorine as mentioned hereinabove.

As noted hereinabove, when the vanadium-containing concentrate contains comparatively large amounts of iron and nickel, it is preferred to roast the vanadium and other metals-containing concentrate obtained via steps (a) and (b) in the presence of oxygen usually at temperatures of 1000 to 3000° F. and preferably from 1200 to 1800° F. Pure oxygen or any suitable oxygen-containing gas or other material can be employed for this purpose, e.g. air, air diluted with inert gases such as nitrogen, carbon monoxide and the like. This also includes flue gases which contain some air with other combustion products. Then the metals can optionally be reduced with hydrogen at temperatures of 800 to 1800° F. using hydrogen pressures of 1 atm. to 2000 p.s.i. to form the corresponding vanadium at lower oxidation level, and iron and nickel metals.

The vanadium oxides and reduced metals are then contacted with carbon monoxide at temperatures of about 150 to 350° F. using pressures of about 200 to about 2000 p.s.i. to preferentially form the iron and nickel carbonyls (vanadium not preferentially reacting to form the vanadium carbonyl at these temperature and pressure conditions). The nickel and iron carbonyls are then removed as a liquid and fractionated under pressure to yield comparatively pure iron carbonyl and nickel carbonyl, respectively as noted hereinabove. Then the vanadium-containing residue from the preferential iron and nickel carbonyl removal step can be contacted with a suitable halogen containing compound at temperatures of 400 to 1600° F. to form the gaseous vanadium halide which is recovered directly therefrom. This vanadium halide can be used or sold as such or can be reduced in the presence of other metals to form alloys of known composition. Thus mixtures of the halide and iron and iron oxides can be reduced with an alkali metal such as sodium to yield a ferro-vanadium from which the residual alkaline materials and salts are leached by water. Likewise mixtures of the vanadium halide and iron may be reduced with hydrogen to form a ferro vanadium alloy and hydrogen chloride along with some residual iron chloride. Again water leaching is a sufficient procedure to provide a halide free material.

The present invention will be illustrated in greater detail by the following illustrative examples, which are included herein to illustrate rather than limit the present invention.

Example 1

A blend containing 100 grams of asphaltenes from Bachaquero crude, 200 grams of recycle asphaltenes from thermal depolymerization and 300 grams of methyl naphthalene was subjected to thermal depolymerization for 3 hours at 750° F. and 1300 p.s.i.g. using 25 cc. of aqueous ammonium hydroxide as an antacid. Upon processing which involved filtration and extraction of the hydrocarbon materials with methyl naphthalene, a metals concentrate of 10 grams or 3.3% on total feed resulted. By analysis this concentrate was found to contain 3.4 wt. percent vanadium as compared to 0.24 wt. percent in the fresh feed.

Example 2

In accordance with the procedure of Example 1, a vanadium containing concentrate of approximately 10 tons is obtained from 10,000 barrels of Bachaquero residuum feed. This concentrate is treated with chlorine gas at the rate of 1000 s.c.f./hr. at 1500° F. The vanadium tetrachloride is condensed and the excess chlorine is recycled to the process. Further purification of the vanadium tetrachloride is obtained by fractional distillation in the presence of chlorine. A recovery of approximately 2700 pounds of vanadium tetrachloride results from this procedure.

Example 3

Another vanadium recovery by halide system is conducted only using HF. The 10 tons of vanadium concentrate as in Example 2 are roasted (by burning in air at approximately 1500° F.) to yield 1600 pounds of metal oxides including vanadium oxide. This oxide mixture is contacted with approximately 200 gallons of 90% aqueous hydrogen fluoride solution at 150° F. to effect solution of the vanadium. Thereupon the slurry is cooled to 75° F. and filtered. The solution of vanadium fluoride is flash distilled to recover the excess hydrogen fluoride for recycle to the process, and the vanadium fluoride is recovered from the residual aqueous solution. 1800 pounds of vanadium tetrafluoride result from this operation.

Example 4

In a thermal deploymerization operation involving filtration and flashing of the methyl naphthalene solvent 10,000 b./d. of West Texas vacuum residuum is blended with 40,000 b./d. of recycle material and 50,000 b./d. of solvent and upon heat treatment as in Example 1 and filtration, 35 t./d. of dry solids concentrate remain. The vanadium content of this residue is approximately 0.03%. The concentrate is burned at 1500° F. to remove the carbonaceous material and to convert the metals and metal sulfides to oxides. Thereupon, the metals concentrate is reduced with hydrogen at a temperature of 1500° F. and a pressure of 100 p.s.i. for 6 hours at a hydrogen rate of 10,000 s.c.f./hr. The reduced material is contacted with carbon monoxide in downflow operation at a temperature of 250° F., pressure of 1000 p.s.i. and exit carbon monoxide rates of 5000 c.f./b. for 10 hours. The liquid and iron carbonyls are separated from the excess carbon monoxide and are fractionated to take the nickel carbonyl overhead as a relatively pure stream leaving the less volatile iron carbonyl as the bottoms portion.

The residual vanadium components are treated with chlorine at the rate of 1000 s.c.f./hr. and a temperature of 1500° F. to provide a relatively pure vanadium tetrachloride free of contamination of iron and nickel chlorides. This integrated process with the West Texas feed results in approximately 200 pounds per day of relatively pure nickel carbonyl, approximately 210 pounds per day of iron carbonyl and approximately 340 pounds of vanadium tetrachloride.

Example 5

A charge of 300,000 pounds per day of alphaltenes recovered from Bachaquero residuum are dissolved in an equal weight of methyl naphthalene, freed of air and peroxides, and the mixture is subjected to thermal depolymerization as in Example 1 which produces gas oils of negligible ash content, concentrating the metals of vanadium and nickel in the insoluble filterable residue. This residue, freed of residual oil, is treated with chlorine gas at a temperature of 1500° F. for 6 hours at a chlorine gas rate of 1000 s.c.f./hr. The volatilized vanadium chloride and excess gas are cooled, and the liquid vanadium tetrachloride is drawn off. The iron and nickel chlorides remaining in the chlorine contacting zone and in the condensation zone are combined and are removed as the mixed salt. An aqueous concentrate of this mixture is contacted with limestone rock to prevent volatility losses in subsequent roasting. The dried residue containing excess limestone rock is roasted in air at 1500° F. and the resultant oxides are reduced with hydrogen and are treated with carbon monoxide as in Example 4.

This process with the Bachaquero feed results in approximately 2700 pounds per day of vanadium tetrachloride, 200 pounds per day of nickel carbonyl and 160 pounds per day of iron carbonyl.

What is claimed is:

1. A process for recovering vanadium from 650° F.+ crude residua which comprises (a) heating an intimate blend of said residua with an organic solvent boiling in the range of about 150 to 800° F. at temperatures ranging from about 650 to 900° F. essentially in the absence of oxygen for an average residence time of about 0.1 to about 6 hours to form an insoluble vanadium-containing concentrate containing a substantial portion of the vanadium present in said residua; (b) separating said insoluble vanadium-containing concentrate; (c) contacting said concentrate with a halogen-containing compound under conditions suitable for forming the corresponding vanadium halide; and (d) recovering said vanadium halide.

2. A process as in claim 1 wherein said halogen-containing compound is chlorine.

3. A process as in claim 1 wherein said halogen-containing compound is HF.

4. A process as in claim 1 wherein said contact in (c) is conducted at temperatures ranging from about 400 to about 1600° F.

5. A process as in claim 1 wherein said contact in (c) is conducted using aqueous HF at temperatures ranging from about 50 to 350° F.

6. A process as in claim 1 wherein said 650° F.+ residua is further characterized by an API gravity of about −8° to about 30° and a molecular weight of about 200 to about 20,000.

7. A process as in claim 1 wherein said 650° F.+ residua in addition to containing vanadium contains iron and nickel and a substantial portion of the iron and nickel thereof is recovered by roasting said insoluble concentrate in an oxygen-containing gas at temperatures of about 400 to about 3000° F. followed by contact with carbon monoxide at temperatures ranging from about 150 to about 350° F. and pressures of about 200 to about 2,000 p.s.i. to preferentially form the iron and nickel carbonyls.

8. A process as in claim 7 wherein said iron and nickel recovery from said insoluble concentrate is conducted prior to the recovery of vanadium therefrom via steps (c) and (d).

9. A process as in claim 7 which includes the step of reducing the oxides of the roasted concentrate prior to said contact with carbon monoxide.

10. A process for recovering vanadium from 650° F. crude residua having an API gravity of about −8° to about 30° and a molecular weight of about 200 to about 20,000 which comprises (a) heating a solution of said residua in an organic solvent boiling in the range of about 400 to about 600° F. at temperatures ranging from about 650 to about 850° F. in the liquid phase essentially in the absence of oxygen for an average residence time of about 0.5 to about 6 hours to form an insoluble vanadium-containing concentrate containing a substantial portion of the vanadium present in said residua; (b) separating said insoluble concentrate; (c) contacting said concentrate with a halogen-containing compound at temperatures of about 50 to about 1600° F. and pressures of about 5 to 500 p.s.i. to form the corresponding vanadium halide, and recovering said vanadium halide.

11. A process as in claim 10 wherein iron and nickel present in said residua are recovered by roasting said insoluble concentrate in an oxygen-containing gas at temperatures of about 1000 to 3000° F. and contacting said roasted concentrate with carbon monoxide at temperatures ranging from about 150 to about 350° F. and pressures of about 200 to about 2000 p.s.i. to preferentially form the iron and nickel carbonyls.

12. A process as in claim 11 which includes the step of reducing the oxides of the roasted concentrate prior to said contact with carbon monoxide.

References Cited

UNITED STATES PATENTS

| | | | |
|---|---|---|---|
| 1,651,967 | 12/1927 | Reed | 23—19.1 |
| 2,255,059 | 9/1941 | Houdry | 23—19.1 |
| 2,372,109 | 3/1945 | Noel | 23—16 |
| 2,383,982 | 9/1945 | Jones | 23—22 |
| 3,227,545 | 1/1966 | Hildreth | 23—87 X |

OSCAR R. VERTIZ, *Primary Examiner.*

HERBERT T. CARTER, *Examiner.*